Patented Oct. 6, 1936

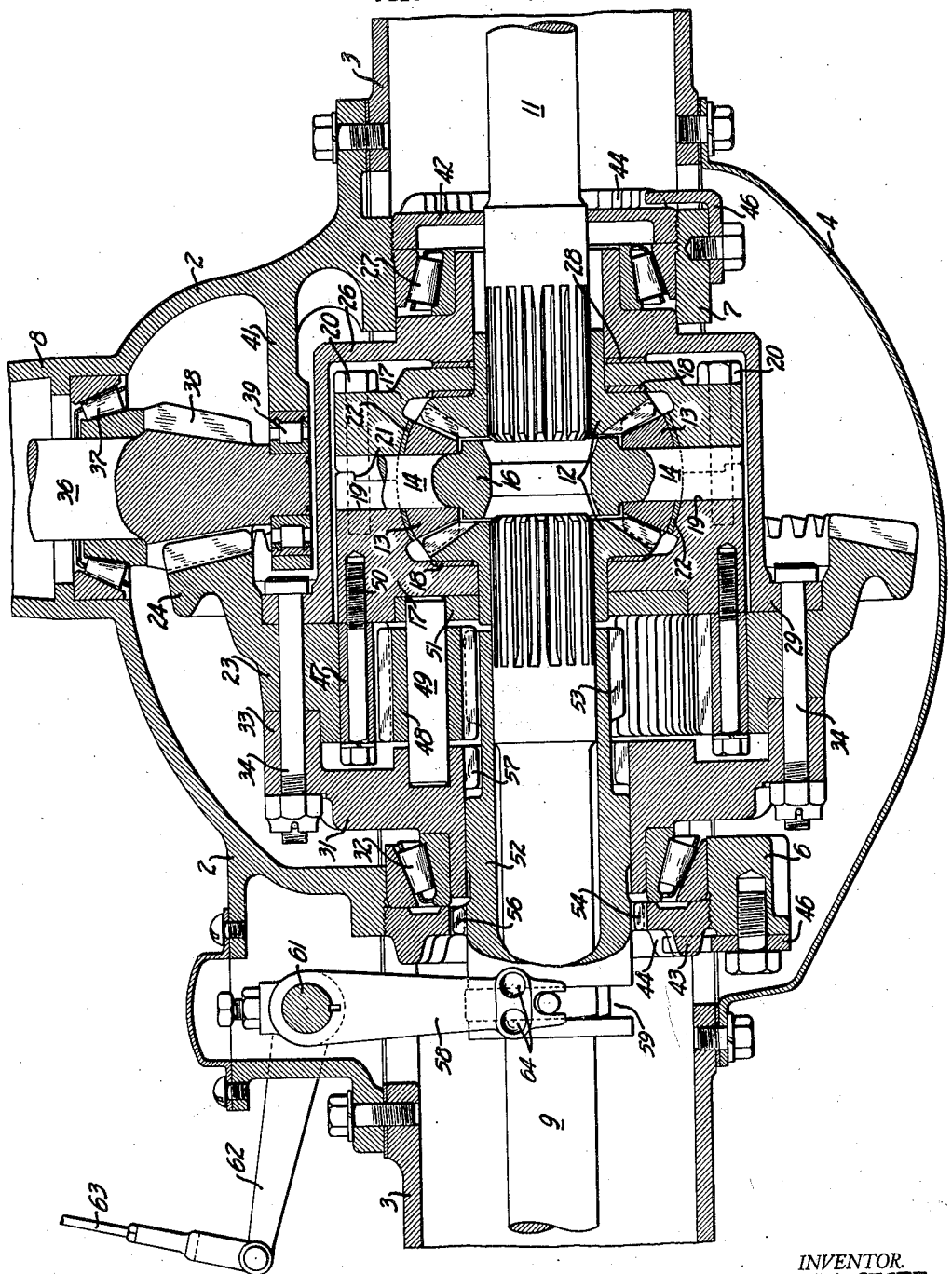

2,056,303

UNITED STATES PATENT OFFICE 2,056,303

SPEED CHANGE AXLE

Charles Ervin Starr, Inglewood, Calif., assignor to Perfecto Gear Differential Co., Bellingham, Wash., a corporation of Washington Application January 30, 1935, Serial No. 4,087

5 Claims. (Cl. 74—314)

My invention relates to rear axles of motor vehicles, and more particularly to those embodying combined differential and planetary gear systems.

It is among the objects of my invention to provide an axle of the character described in which the planetary gear system affords several speed changes.

Another object of my invention is to provide an improved construction in which the design and arrangement of the mechanism contributes to improve the support and efficiency of the mechanical parts.

A further object of my invention is to provide a mechanism of the character described which may be readily installed in an existing rear axle housing.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

The figure of the drawing is a horizontal sectional view of an axle embodying the improvements of my invention.

In terms of broad inclusion, the speed change axle embodying my invention comprises a housing, a pair of axle shafts in the housing and a differential gear system connecting the shafts and having a differential casing. A planetary gear system is also provided and is connected with the differential gearing with its ring gear mounted on the differential casing. A rotor is provided encasing both gear systems, and means are provided for driving the rotor. A bearing ring is journaled in the differential casing, and the pinions of the planetary system are arranged with one end mounted on the rotor and the other end mounted on the bearing ring. A sun gear is also provided meshed with the planet pinion, and means are provided for optionally holding the sun gear against rotation or locking the elements of the planetary system for rotation as a unit.

In greater detail, and referring particularly to the drawing, the speed change axle embodying my invention comprises a specially built housing 2 adapted for mounting on the inner side of the ordinary differential housing 3 of an automobile. A cover plate 4 is provided over the outer side of the differential housing 3 in the usual manner.

The housing 2 is designed to carry the entire mechanism embodying my invention, and for this purpose is provided with a pair of annular end brackets 6 and 7 positioned within and in axial alignment with the axle housing 3. A neck 8 is also provided on the housing 2 for connection with the torque tube of the automobile. The axle shafts 9 and 11 project into the housing 2 through the annular supporting brackets 6 and 7, as clearly shown in the drawing.

A differential gear system is provided within the housing for connecting the axle shafts together. This system comprises a pair of differential gears 12 mounted on the opposing ends of the axles and connected by differential pinions 13 journaled on the arms 14 of a spider 16 extending transversely between the ends of the axles 9 and 11. The core of the spider is preferably annular in shape to provide a central opening for clearing the ends of the axles so that the latter are free to project into the core if axial adjustment is necessary. The differential assembly is enclosed in a casing 17 journaled on the hubs of the gears 12 with suitable bearing plates 18 interposed between the casing and the gears.

The differential casing 17 is split transversely along the axis of the differential pinion, and the casing is provided with sockets 19 for receiving the arms 14 of the spider. Suitable studs 20 operate to hold the two halves of the casing together with the spider arms clamped therebetween. The two halves of the casing are preferably machined to provide an offset portion 21 so that the sections are interlocked when fitted together.

The inside of the casing is also provided with curved surfaces complementary to the curved surfaces of the differential pinions 13, and a complementary bearing plate 22 is preferably interposed between the surfaces. By this arrangement a bearing is provided for the outer face of the pinions.

A planetary gear system is also provided, connected with the differential gear system, and a rotor is provided for encasing both gear systems. This rotor preferably comprises an annular central portion 23 carrying the integrally formed master gear 24. The rotor also comprises a bell-shaped end portion 26 surrounding the differential system and journaled at its outer end in a bearing 27 held by the bracket 7. This end of the rotor encircles the axle 11 and provides a journal for the hub of the differential gear 12. A bearing plate 28 is preferably interposed between the rotor and the differential casing 17. The inner end of the rotor portion 26 is provided with a flange 29 abutting the central rotor portion 23.

The other end of the rotor also comprises a bell-shaped portion 31 journaled at its outer end in a bearing 32 held by the housing bracket 6, and having a flange 33 at its inner end abutting the central rotor portion 23. Bearings 27 and 32 in which the ends of the rotor are journaled comprise the main bearings of the unit.

Rotor sections 23, 26 and 31 are preferably secured together by bolts 34 extending through the central rotor portion 23 and the flanges 29 and 33 of the end portions; the flanges being preferably seated in annular recesses provided in the central portion to increase the rigidity of the unit when assembled.

Means are provided for driving the rotor. For this purpose a drive shaft connected with the propeller shaft of the automobile is journaled in the neck 8 of the housing in a suitable bearing 37. A driving pinion 38 is mounted for rotation with the shaft 36, and the inner end of the shaft is journaled in a bearing 39 supported in a bracket 41 formed in the housing 2. This inner support for the driving pinion gives added rigidity.

Adjustable means are provided for tightening the bearings 27 and 32 of the rotor. For this purpose annular holding rings 42 and 43 are threaded in the ends of the brackets 7 and 6 respectively. These holding rings encircle the axle shafts and are provided with lugs 44 with which a suitable tool may be engaged for tightening the bearings. A locking plate 46 is provided for engaging the lugs of each of the holding rings for fixing the latter in a selected position of adjustment. As clearly shown in the drawing this adjustment to take up the bearings may be effected by merely removing the cover plate 4 of the axle housing.

The planetary system of my axle comprises a ring gear 47 journaled in the annular central portion 23 of the rotor, and mounted directly on the differential casing 17 by suitable studs 50. The pinions 48 of the planetary system are journaled on short shafts 49 mounted at one end on the rotor portion 31 and supported at the other end by a bearing ring 51 journaled in the differential casing 17. By this arrangement the driving torque from the driving pinion 38 is transmitted through the rotor to the planet pinion mounting and thence to the differential casing by way of the planet pinion and ring gear.

Means are provided for cutting the planetary system into and out of the drive. For this purpose a sleeve 52 is slidably mounted within the rotor portion 31 and on the axle shaft 9. This sleeve projects through the holding ring 43, and has teeth 53 formed on its inner end and meshed with the planet pinion 48 to provide the sun gear for the planetary system. Teeth 54 are also formed on the inside of the holding ring or fixed element 43, and complementary teeth 56 are formed on the sleeve 52 adapted to mesh with the teeth 54 of the fixed element. The holding ring in this connection is referred to as a fixed element because of its fixed relation with respect to the housing.

When the sleeve teeth 56 are meshed with the teeth 54 of the fixed element, as shown in the drawing, the sleeve and consequently the sun gear 53 are held against rotation, and the pinion 48 is caused to planetate about the sun gear when the rotor is being driven. Under these conditions the differential casing 17 is caused to rotate with respect to the rotor, and at an increased speed. In other words, an overdrive is provided.

Suitable teeth 57 are also formed on the inside of the rotor portion 31, with which the teeth of the sun gear 53 may be meshed upon outward shifting of the sleeve. When the sleeve is shifted outwardly the teeth 56 move out of engagement with the teeth 54 of the fixed element, so that the sleeve is free to rotate when the sun gear is meshed with the teeth 57 of the rotor or pinion mounting. Under these conditions the planet pinion 48 is prevented from rotating about its own axis, and the elements of the planetary system are therefore locked together for rotation as a unit. In other words, the differential casing 17 is locked for rotation directly with the rotor 31. This gives a speed which is lower than that when the planetary system is functioning in its overdrive capacity.

Means are provided for shifting the sleeve to optionally engage the same with either the fixed element or the pinion mounting. The shifting mechanism comprises a yoke 58 engaging an annular groove 59 in the sleeve 52. The yoke is mounted on a shaft 61 journaled in the housing 2, and the shaft is provided with a crank 62 connected with a suitable shifting lever by the rod 63. The latching of the sleeve in either one or the other of its operating positions may be accomplished by providing a suitable spring pressed pin engageable with sockets 64 provided in an arm of the yoke 58.

I claim:

1. A speed change axle comprising a housing, main bearings mounted in the ends of the housing, a rotor in the housing and having the ends thereof journaled in said bearings, a sleeve slidably journaled in one end of the rotor, a pair of axle shafts projecting into the ends of said rotor, a differential gear system connecting the shafts and comprising a gear mounted on each shaft and also a differential casing journaled on the hubs of said gears, one of the shafts being journaled in the sleeve and the other having the hub of its gear journaled in the other end of the rotor, a planetary gear system connected with the differential gearing and comprising a ring gear journaled in the rotor and mounted on the differential casing, a bearing ring journaled in the differential casing, a planet pinion meshed with the ring gear and having one end mounted on the rotor and the other end mounted on the bearing ring, teeth on the sleeve and meshed with the planet pinion to provide the sun gear for the planetary system, means for driving the rotor, and means for optionally holding the sleeve against rotation or locking it to the planet pinion mounting.

2. A speed change axle comprising a housing, main bearings mounted in the ends of the housing, a rotor in the housing and having the ends thereof journaled in said bearings, a sleeve slidably journaled in one end of the rotor, a pair of axle shafts projecting into the ends of said rotor, a differential gear system connecting the shafts and comprising a gear mounted on each shaft and also a differential casing journaled on the hubs of said gears, one of the shafts being journaled in the sleeve and the other having the hub of its gear journaled in the other end of the rotor, a planetary gear system connected with the differential gearing and comprising a ring gear journaled in the rotor and mounted on the differential casing, a bearing ring journaled in the differential casing, a planet pinion meshed with the ring gear and having one end mounted on the rotor and the other end mounted on the bearing ring, teeth on the sleeve and meshed with the planet pinion to provide the sun gear for the planetary system, means for driving the rotor, and means for optionally holding the sleeve against rotation or locking it to the rotor.

3. A speed change axle comprising a housing, main bearings mounted in the ends of the housing, a rotor in the housing and having the ends thereof journaled in said bearings, a sleeve slidably journaled in one end of the rotor, a pair of axle shafts projecting into the ends of said rotor, a differential gear system connecting the shafts and comprising a gear mounted on each shaft and also a differential casing journaled on the hubs of said gears, one of the shafts being journaled in the sleeve and the other having the hub of its gear journaled in the other end of the rotor, a planetary gear system connected with the differential gearing and comprising a ring gear journaled in the rotor and mounted on the differential casing, a bearing ring journaled in the differential casing, a planet pinion meshed with the ring gear and having one end mounted on the rotor and the other end mounted on the bearing ring, teeth on the sleeve and meshed with the planet pinion to provide the sun gear for the planetary system, means for driving the rotor, a fixed element, and means for shifting the sleeve to optionally lock it to the fixed element or to the rotor.

4. A speed change axle comprising a housing, main bearings mounted in the ends of the housing, a rotor in the housing and having the ends thereof journaled in said bearings, a sleeve slidably journaled in one end of the rotor, a pair of axle shafts projecting into the ends of said rotor, a differential gear system connecting the shafts and comprising a gear mounted on each shaft and also a differential casing journaled on the hubs of said gears, one of the shafts being journaled in the sleeve and the other having the hub of its gear journaled in the other end of the rotor, a planetary gear system connected with the differential gearing and comprising a ring gear journaled in the rotor and mounted on the differential casing, a bearing ring journaled in the differential casing, a planet pinion meshed with the ring gear and having one end mounted on the rotor and the other end mounted on the bearing ring, teeth on the sleeve and meshed with the planet pinion to provide the sun gear for the planetary system, means for driving the rotor, a holding ring for one of the main bearings and secured to the housing, and means for shifting the sleeve to optionally lock it to the holding ring or to the rotor.

5. The combination with a differential gear system having a differential casing, of a planetary gear system comprising a rotor, a ring gear mounted on the differential casing, a planet pinion mounted at one end on the rotor and meshed with the ring gear, said differential casing having an annular recess having an internal cylindrical bearing surface, a ring for supporting the other end of the pinion and lying within the recess with its outer surface substantially flush with the casing and having a cylindrical peripheral surface bearing against said inner cylindrical surface of the casing recess, and a sun gear meshed with the pinion.

CHARLES ERVIN STARR.